(12) United States Patent
Yoshitomi et al.

(10) Patent No.: US 7,009,351 B2
(45) Date of Patent: Mar. 7, 2006

(54) SINGLE PHASE MOTOR DRIVING UNIT

(75) Inventors: Tetsuya Yoshitomi, Gunma (JP); Yasuyuki Ueshima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/145,100

(22) Filed: Jun. 3, 2005

(65) Prior Publication Data

US 2005/0225273 A1    Oct. 13, 2005

Related U.S. Application Data

(63) Continuation of application No. 10/699,263, filed on Oct. 30, 2003.

(30) Foreign Application Priority Data

Oct. 30, 2002    (JP) .............................. 2002-315655

(51) Int. Cl.
   *H02P 7/00*    (2006.01)
   *H02K 23/00*    (2006.01)
(52) U.S. Cl. ....................... 318/254; 318/439; 318/459
(58) Field of Classification Search ...................... None
   See application file for complete search history.

(56) References Cited

U.S. PATENT DOCUMENTS

| 5,455,885 | A | * | 10/1995 | Cameron | ..................... | 388/834 |
| 5,869,944 | A | * | 2/1999 | Tanina | ......................... | 318/599 |
| 6,420,847 | B1 | * | 7/2002 | Galbiati et al. | ............. | 318/727 |
| 6,504,328 | B1 | * | 1/2003 | Gontowski, Jr. | ............ | 318/254 |

FOREIGN PATENT DOCUMENTS

| JP | 3822408 | A | * | 10/1938 |
| JP | 58172995 | A | * | 10/1983 |
| JP | 07087775 | A | * | 3/1995 |
| JP | 2000050673 | A | * | 2/2000 |
| JP | 2004104951 | A | * | 4/2004 |

* cited by examiner

*Primary Examiner*—Marlon T. Fletcher
*Assistant Examiner*—Patrick Miller
(74) *Attorney, Agent, or Firm*—Steven C. Sereboff; SoCal IP Law Group LLP

(57) ABSTRACT

A single phase motor driving unit includes: a first driving transistor supplying a single phase coil with a driving electric current in a certain direction; a second driving transistor supplying the single phase coil with a driving electric current in the opposite direction; a comparison section comparing an intensity of a sine wave signal obtained from a Hall device detecting a rotational position of a single phase motor and a reference value, and generating a timing signal in a predetermined period starting immediately before and ending immediately after a point at which the direction of the driving electric current for the single phase coil changes; and a recirculating section recirculating the driving electric current by controlling ON-OFF timings of the first and the second driving transistors in the predetermined period in which the timing signal is generated such that, within a given period in which the first and the second driving transistors on the side to which the driving electric current flows out from the single phase coil are ON, the first and the second driving transistors on the side from which the driving electric current is supplied to the single phase coil each becomes ON for a period that is shorter than the given period.

3 Claims, 5 Drawing Sheets

Prior Art:

SINGLE PHASE MOTOR DRIVING UNIT

CROSS-REFERENCE TO RELATED APPLICATIONS

The present application claims priority upon Japanese Patent Application No. 2002-315655 filed on Oct. 30, 2002, which is herein incorporated by reference.

BACKGROUND OF THE INVENTION

1. Field of the Invention

The present invention relates to a single phase motor driving unit.

2. Description of the Related Art

A conventional single phase motor driving unit will be described below with reference to FIGS. 5 and 6. FIG. 5 is a circuit diagram showing the conventional single phase motor driving unit, and FIG. 6 is a waveform chart showing driving waveforms for the conventional single phase motor driving unit.

NPN-type bipolar transistors 2 and 4 (first driving transistors) supply a single phase coil 6 with a driving electric current in the right direction in the drawing when driving signals A and D are supplied. Hence, the collector-emitter path of the bipolar transistor 2, the single phase coil 6, and the collector-emitter path of the bipolar transistor 4 are connected in series between a power source $V_{cc}$ and a ground $V_{ss}$. In the same way, NPN-type bipolar transistors 8 and 10 (second driving transistors) supply the single phase coil 6 with a driving electric current in the left direction in the drawing when driving signals C and B are supplied. Hence, the collector-emitter path of the bipolar transistor 8, the single phase coil 6, and the collector-emitter path of the bipolar transistor 10 are connected in series between the power source $V_{cc}$ and the ground $V_{ss}$. And by the bipolar transistors 2, 4 and 8, 10 being complementarily switched on and off to change the direction of the driving electric current for the single phase coil 6 as needed, the single phase motor rotates.

Furthermore, the change timings of the driving signals A, B, C, and D are slightly deviated from each other. That is, when the bipolar transistors 2, 4 and 8, 10 are complementarily switched on and off, no electric current passes through between the power source $V_{cc}$ and the ground $V_{ss}$ and the circuit is not short-circuited because the bipolar transistors 2, 4 and 8, 10 are all off simultaneously for a short time. See Japanese Patent Application Laid-Open Publication No. Hei7-87775.

However, when the bipolar transistors 2, 4 and 8, 10 are complementarily switched on and off, the driving electric current in the right direction in the drawing for the single phase coil 6 circulates along the recirculation path indicated by a broken line to be dissipated in a short time. On the other hand, the driving electric current in the left direction in the drawing for the single phase coil 6 circulates along the recirculation path indicated by an alternate long and short dashed line to be dissipated in a short time. That is, in phase changes where the bipolar transistors 2, 4 and 8, 10 are complementarily switched on and off, the driving electric current for the single phase coil 6 has ineffective electric current portions indicated by oblique lines and does not contribute much to torque, and thus the direction of the driving electric current for the single phase coil 6 suddenly changes. There is a problem that by this, vibrations, noises, and power consumption of the single phase motor become large.

SUMMARY OF THE INVENTION

One aspect of the present invention to solve the above and other problems provides a single phase motor driving unit comprising: a first driving transistor supplying a single phase coil with a driving electric current in a certain direction; a second driving transistor supplying the single phase coil with a driving electric current in the opposite direction; a comparison section which compares an intensity of a sine wave signal obtained from a Hall device detecting a rotational position of a single phase motor and a reference value, and which generates a timing signal in a predetermined period that starts immediately before and ends immediately after a point at which the direction of the driving electric current for the single phase coil changes; and a recirculating section which recirculates the driving electric current by controlling ON-OFF timings of the first driving transistor and the second driving transistor in the predetermined period in which the timing signal is generated such that, within a given period in which the first driving transistor and the second driving transistor on the side to which the driving electric current flows out from the single phase coil are ON, the first driving transistor and the second driving transistor on the side from which the driving electric current is supplied to the single phase coil each becomes ON for a period that is shorter than the given period.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the description in the present specification and the description of the accompanying drawings.

===Structure of the Single Phase Motor Driving Unit===

Figure 1:
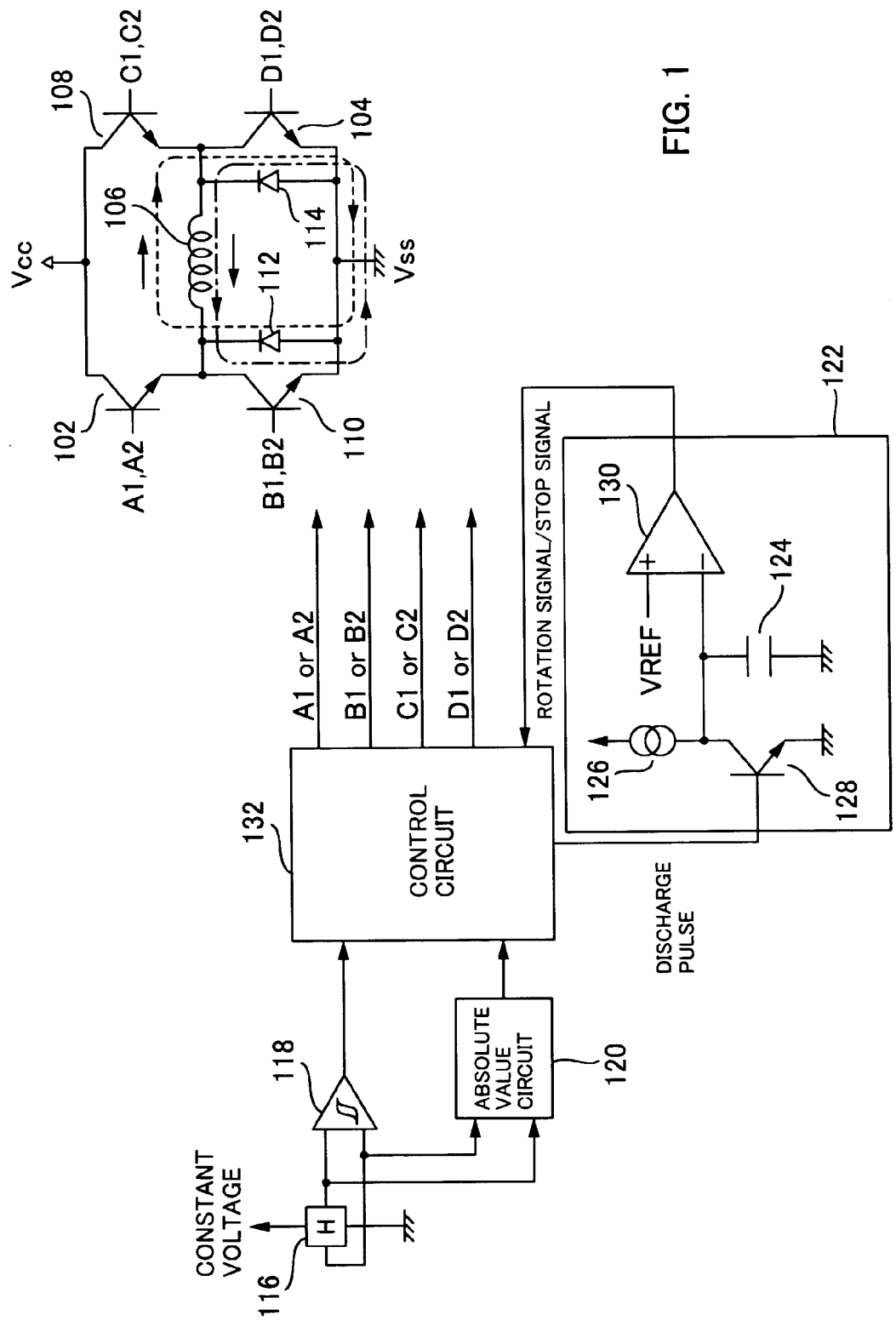
FIG. 1 is a circuit block diagram showing a single phase motor driving unit according to the present invention.

The structure of the single phase motor driving unit of the present invention will be described below with reference to FIG. 1. FIG. 1 is a circuit block diagram showing the single phase motor driving unit of the present invention. Note that in this embodiment, the single phase motor driving unit is an integrated circuit, and that a single phase coil is externally connected with the integrated circuit.

Figure 6:
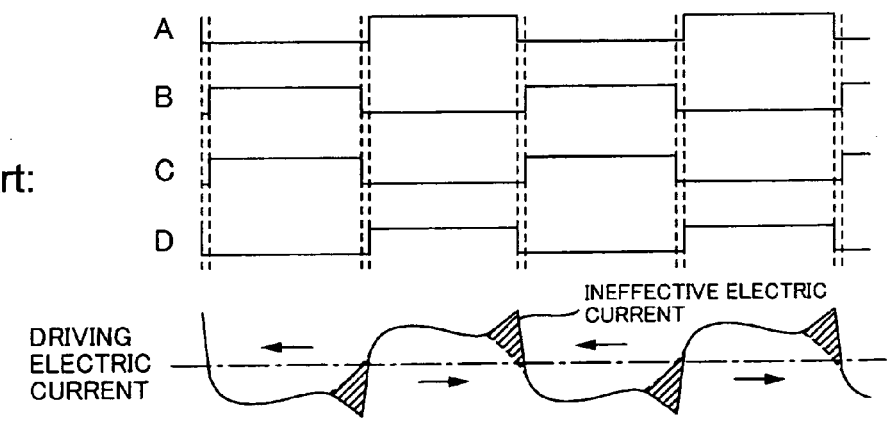
FIG. 6 is a waveform chart showing driving waveforms of the prior art single phase motor driving unit.

NPN-type bipolar transistors 102 and 104 (first driving transistors) supply a driving electric current in the right direction in the drawing for a single phase coil 106 in FIG. 1. Hence, the collector-emitter path of the bipolar transistor 102, the single phase coil 106, and the collector-emitter path of the bipolar transistor 104 are connected in series between a power source $V_{cc}$ and a ground $V_{ss}$. In the same way, NPN-type bipolar transistors 108 and 110 (second driving transistors) supply a driving electric current in the left direction in the drawing for the single phase coil 106 in FIG. 1. Hence, the collector-emitter path of the bipolar transistor 108, the single phase coil 106, and the collector-emitter path of the bipolar transistor 110 are connected in series between the power source $V_{cc}$ and the ground $V_{ss}$. Then the bipolar transistors 102, 104 and 108, 110 are complementarily switched on and off by being supplied with either of driving signals A1, B1, C1, and D1 or driving signals A2, B2, C2, and D2 identical to the driving signals A, B, C, and D of FIG. 6, and thereby the direction of the driving electric current for the single phase coil 106 is changed as needed for the single phase motor to rotate. A recirculation diode 112 is for recirculating the driving electric current when the direction of the driving electric current for the single phase coil 106 changes from the right direction to the left direction in the drawing, and is connected in parallel with the collector-emitter path of the bipolar transistor 110. Similarly, a recirculation diode 114 is for recirculating the driving electric current when the direction of the driving electric current for the single phase coil 106 changes from left to right in the drawing, and is connected in parallel with the collector-emitter path of the bipolar transistor 104.

A Hall device 116 is fixed at a predetermined position opposing the magnet on the rotor side of the single phase motor and biased at a constant voltage. The Hall device 116 outputs a sine wave signal corresponding to the rotational position of the single phase motor, that is, corresponding to the change of the magnetic pole on the rotor side opposing thereto. A comparison circuit 118 has a hysteresis characteristic for preventing chattering and is for reshaping the sine wave signal from the Hall device 116 into a rectangular wave signal. Note that the rectangular wave signal is a flow-change signal that causes the driving electric current for the single phase coil 106 to change direction to the right direction or the left direction in the drawing. An absolute value circuit 120 (a comparison section) compares the absolute value of the sine wave signal and a reference value and outputs a timing signal for recirculating the driving electric current for the single phase coil 106.

A detecting section 122 includes a capacitor 124, a constant electric current source 126, an NPN-type bipolar transistor 128, a comparison circuit 130, and a reference voltage VREF, and detects the rotation and stop of the single phase motor. Here, the capacitor 124 and the constant electric current source 126 constitute a charging circuit, and the capacitor 124 and the bipolar transistor 128 constitute a discharging circuit. At the non-grounded side of the capacitor 124, a charge-discharge voltage having a sawtooth-shaped waveform emerges. The plus (non-inverting input) terminal of the comparison circuit 130 is connected with the reference voltage VREF, and the minus (inverting input) terminal is connected with the non-grounded side of the capacitor 124. That is, the comparison circuit 130, by comparing the charge-discharge voltage at the non-grounded side of the capacitor 124 and the reference voltage VREF, outputs a detected signal of "H" in level when the single phase motor is rotating and "L" when suspended.

A control circuit 132 (a recirculating section) performs operations on the outputs of the comparison circuit 118 and the absolute value circuit 120 as needed depending on the output value of the detecting section 122 to selectively output the driving signals A1, B1, C1, and D1 or the driving signals A2, B2, C2, and D2. That is, the control circuit 132 outputs the driving signals A1, B1, C1, and D1 when the detection signal of the comparison circuit 130 is at "L" and the driving signals A2, B2, C2 and D2 when the detection signal of the comparison circuit 130 is at "H".

===Action of the Detecting Section===

Figure 2:
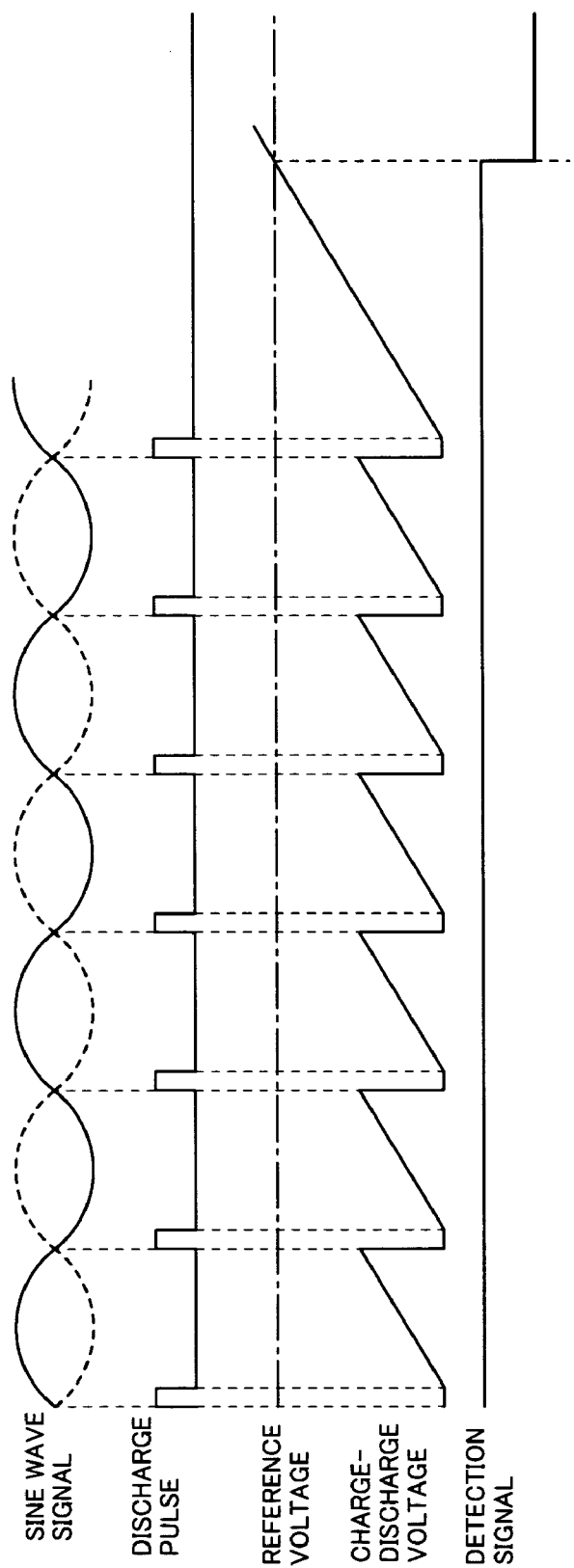
FIG. 2 is a waveform chart showing the waveform of each portion of the detecting section constituting a part of the single phase motor driving unit according to the present invention.

Next, the action of the detecting section 122 will be described below with reference to FIGS. 1 and 2. FIG. 2 is a view showing a waveform of each portion of the detecting section forming a part of the single phase motor driving unit of the present invention.

The Hall device 116 outputs sine wave signals indicated by solid and broken lines and having a phase difference of 180 degrees corresponding to the rotational position of the single phase motor. These sine wave signals are reshaped by the comparison circuit 118 into rectangular wave signals, which are then supplied to the control circuit 132. The control circuit 132 outputs a discharge pulse at the point when the rectangular wave signals change (i.e. at the zero-cross point of the sine wave signals), that is, at the flow change point of the driving electric current for the single phase coil 106. This discharge pulse is supplied to the base of the bipolar transistor 128 of the detecting section 122. Therefore, when the single phase motor is rotating, because the charge-discharge voltage at the non-grounded side of the capacitor 124 is smaller than the reference voltage VREF, the comparison circuit 130 outputs the detection signal of "H". On the other hand, when the single phase motor is suspended, because the charge-discharge voltage at the non-grounded side of the capacitor 124 is greater than the reference voltage VREF, the comparison circuit 130 outputs the detection signal of "L".

===Action of the Single Phase Motor Driving Unit===

Figure 3:
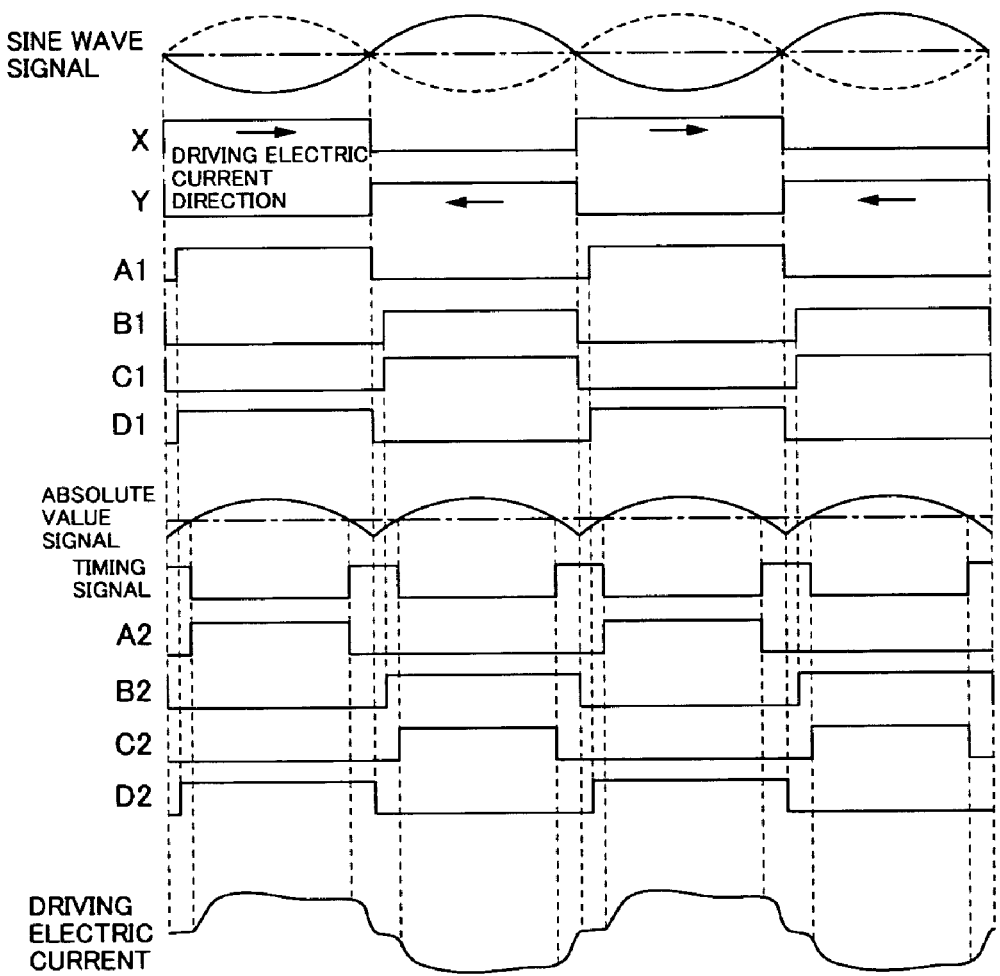
FIG. 3 is a waveform chart showing the waveform of each portion in FIG. 1.
Figure 4:
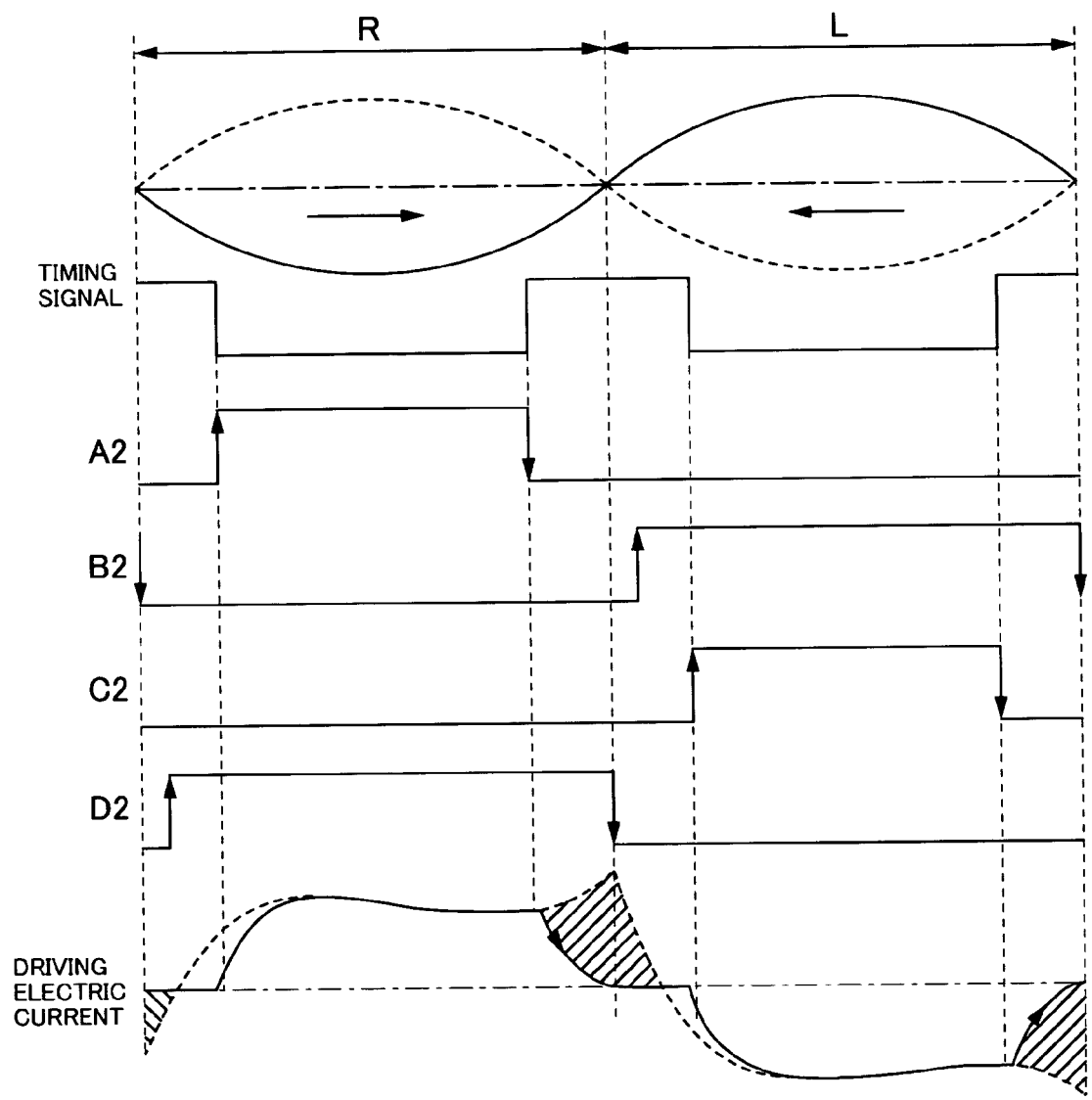
FIG. 4 is a waveform chart showing a major part of the waveforms of FIG. 3 on a larger scale.
Figure 5:
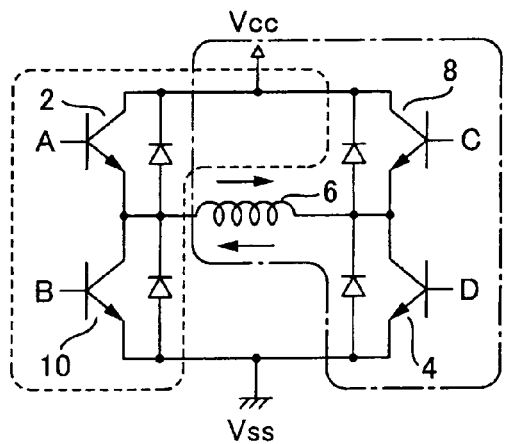
FIG. 5 is a circuit diagram showing a prior art single phase motor driving unit.

Next, the action of the single phase motor driving unit will be described below with reference to FIGS. 1, 3 and 4. FIG. 3 is a waveform chart showing a waveform of each portion. FIG. 4 is a waveform chart showing a major part of the waveforms of FIG. 3 on a larger scale. Note that the driving electric current's portions indicated by oblique lines in FIG. 4 show reduced electric current amounts with respect to the conventional driving electric current (indicated by a broken line).

<<Rotation Mode>>

The action of the single phase motor driving unit when the single phase motor is rotating will be described below.

The Hall device 116 outputs sine wave signals indicated by solid and dashed wave lines and having a phase difference of 180 degrees corresponding to the rotational position of the single phase motor. With these sine wave signals being inputted thereto, the comparison circuit 118 compares the sine wave signals with a reference value (zero-cross) to output rectangular wave signals X and Y which are in-phase as the sine wave signals absolutely but are different by 180 degrees to each other. At the same time, with the sine wave signals being inputted thereto, the absolute value circuit 120 takes the absolute value of the sine wave signal and compares the absolute value and a reference value to output a timing signal of "H" when the absolute value is smaller than the reference value. That is, the "H" period of the timing signal surely includes a flow change point (a zero-cross point of the sine wave signals) of the driving electric current for the single phase coil 106 and extends backwards and forwards, centering on this flow change point. In other words, it becomes possible to reliably get hold of the timing of the predetermined period that starts immediately before and ends immediately after the point at which the direction of the driving electric current for the single phase coil changes.

The detection signal of the comparison circuit 130 is "H" because the single phase motor is rotating. In other words, the control circuit 132 outputs the driving signals A2, B2, C2, and D2 by performing signal processing using the timing signal of the absolute value circuit 120. Specifically, the control circuit 132 first generates the driving signals A1, B1, C1, and D1 identical to the driving signals A, B, C, and D in FIG. 6 and then outputs the driving signals A2, B2, C2, and D2 in which the driving signals A1 and C1 go "L" only in the "H" period of the timing signal. That is, the driving signal A2 becomes a signal of "H" only in the "L" period of the timing signal out of a period R when the driving electric current for the single phase coil 106 is in the right direction in the drawing. Likewise, the driving signal C2 becomes a signal "H" only in the "L" period of the timing signal out of a period L when the driving electric current for the single phase coil 106 is in the left direction in the drawing.

The recirculation action when the direction of the driving electric current for the single phase coil 106 is changed will be described below.

First, when the driving signals A2 and D2 rise, the bipolar transistors 102 and 104 are turned on, and the driving electric current flows in the right direction in the drawing through the single phase coil 106. Next, when the driving signal A2 falls, only the bipolar transistor 104 stays on. Hence, as the driving electric current in the right direction in the drawing for the single phase coil 106 circulates clockwise through a recirculation path, which is indicated by a broken line, consisting of the single phase coil 106, the bipolar transistor 104, and the recirculation diode 112, it is dissipated gradually to decrease over time to zero. Next, when the driving signal D2 falls, the bipolar transistor 104 is turned off at the flow change point of the driving electric current for the single phase coil 106.

After that, when the driving signals B2 and C2 rise, the bipolar transistors 108 and 110 are turned on, and the driving electric current flows in the left direction in the drawing through the single phase coil 106. That is, the direction of the driving electric current is changed. Next, when the driving signal C2 falls, only the bipolar transistor 110 stays to be on. Hence, as the driving electric current in the left direction in the drawing for the single phase coil 106 circulates counterclockwise through a recirculation path, which is indicated by alternate long and short dashed lines, consisting of the single phase coil 106, the bipolar transistor 110, and the recirculation diode 114, it is dissipated gradually to decrease over time to zero. Next, when the driving signal B2 falls, the bipolar transistor 110 is turned off at the flow change point of the driving electric current for the single phase coil 106. After that, the above actions are repeated. In this way, it becomes possible to reliably recirculate the driving electric current for the single phase coil.

In this manner, the driving electric current for the single phase coil 106, as gradually decreasing to zero, changes from one direction to the other in the "H" period of the timing signal. That is, the direction of the driving electric current for the single phase coil 106 changes in a soft-switching manner. Thereby vibrations and noises of the single phase motor can be reduced. Moreover, the driving electric current for the single phase coil 106 is reduced for the amount indicated by the oblique lines from the conventional driving electric current in the "H" period of the timing signal. Thereby the power consumption of the single phase motor can be reduced.

<<Start Mode>>

The action of the single phase motor driving unit when the single phase motor does not start will be described below.

For example, in a state where the Hall device 116 continues to output sine wave signals that correspond to the "H" period of the timing signal, the single phase motor does not start by the driving signals A2, B2, C2, and D2 by which the recirculation path, indicated by the broken or dashed line, is created, but stays suspended. In order to solve this problem, the control circuit 132 outputs the driving signals A1, B1, C1, D1 when the single phase motor cannot start and shift to the rotation.

Specifically, the detected signal of the comparison circuit 130 is at "L" because the single phase motor is suspended and does not start. In other words, the control circuit 132 outputs the driving signals A1, B1, C1, and D1 by performing signal processing not using the timing signal of the absolute value circuit 120. Hence, even when the Hall device 116 and the rotor of the single phase motor are suspended while opposing each other in the above-mentioned state, the bipolar transistors 102, 104, 108, and 110 are complementarily switched on and off according to the driving signals A1, B1, C1, and D1, and thus the direction of the driving electric current for the single phase coil 106 changes as needed for the single phase motor to start rotating. That is to say, since the recirculating section halts the recirculation action until the single phase motor starts rotating, it becomes possible to start rotating the single phase motor even when the single phase motor is in a halted position where it cannot start.

After that, the detected signal of the comparison circuit 130 is at "H" because the single phase motor is rotating. In other words, the control circuit 132 outputs the driving signals A2, B2, C2, and D2 by changing the signal processing to one using the timing signal of the absolute value circuit 120 synchronously with the timing when the detected signal of the comparison circuit 130 changes from "L" to "H". Hence, the single phase motor continues to rotate with low vibrations, low noises, and low power consumption.

As described above, even when the Hall device 116 and the rotor of the single phase motor are suspended while opposing each other in the above-mentioned state, the single phase motor can be certainly started. Furthermore, because driving signals identical to those of the conventional art are used only for a short period until the rotation of the single phase motor is detected, vibrations, noises, and power consumption of the single phase motor can be reduced.

===Other Embodiments===

Although the single phase motor driving unit according to the present invention has been described above, the embodiment described above is provided to facilitate the understanding of the present invention and not intended to limit the present invention to the details shown. It should be understood that various changes and modifications can be made within the spirit and scope of the present invention and it is a matter of course that the equivalents thereof are included in the present invention.

<<First and Second Driving Transistors>>

In this embodiment, the first and second driving transistors are bipolar transistors. However, the present invention is not limited to this. For example, N-channel-type or P-channel-type MOSFET can be used as the first and second driving transistors.

<<Regeneration Diodes>>

In this embodiment, the recirculation diodes are devices separate from the first and second driving transistors. However, the present invention is not limited to this. For example, parasitic diodes of the first and second driving transistors can be used as the recirculation diodes. Thereby, when integrating the single phase motor driving unit into a chip, the chip size can be made smaller.

<<Absolute Value Circuit>>

In this embodiment, the reference value set in the absolute value circuit is constant. However, the present invention is not limited to this. For example, with the reference value being variable, timing signals corresponding to characteristics of various single phase motors can be obtained. That is, a single phase motor driving unit with high versatility can be provided. Furthermore, by adjusting the "H" period of the timing signal to be variable in length, the power consumption can be further reduced.

Although the preferred embodiment of the present invention has been described in detail, it should be understood that various changes, substitutions and alterations can be made therein without departing from the spirit and scope of the invention as defined by the appended claims.

What is claimed is:

1. A single phase motor driving unit comprising:
   a first driving transistor supplying a single phase coil with a driving electric current in a first direction;
   a second driving transistor supplying said single phase coil with a driving electric current in a direction opposite to the first direction;
   a comparison section which compares an intensity of a sine wave signal obtained from a Hall device detecting a rotational position of the single phase motor and a reference value, and which generates a timing signal in a predetermined period that starts immediately before and ends immediately after a point at which the direction of the driving electric current for said single phase coil changes; and
   a recirculating section which recirculates the driving electric current by controlling ON-OFF timings of said first driving transistor and said second driving transistor in said predetermined period in which said timing signal is generated such that, within a given period in which said first driving transistor and said second driving transistor on the side to which the driving electric current flows out from said single phase coil are ON, said first driving transistor and said second driving transistor on the side from which the driving electric current is supplied to said single phase coil each becomes ON for a period that is shorter than said given period.

2. The single phase motor driving unit according to claim 1, further comprising a recirculation diode for recirculating the driving electric current for said single phase coil.

3. The single phase motor driving unit according to claim 1, further comprising:
   a detecting section which detects rotation and stop of said single phase motor and outputs a rotation signal and a stop signal,
   wherein when said single phase motor cannot start, said recirculating section stops recirculating the driving electric current for said single phase coil until the output of said detecting section changes from the stop signal to the rotation signal.

* * * * *